Oct. 1, 1963  F. J. STAUNTON  3,105,915
ELECTRO-MAGNETIC MOTION CONVERTING ROTARY ACTUATOR
Filed Jan. 3, 1962

INVENTOR.
FREDERIC JAMES STAUNTON
BY
Philip A. Weiss
ATTORNEY

United States Patent Office 3,105,915
Patented Oct. 1, 1963

3,105,915
ELECTRO-MAGNETIC MOTION CONVERTING ROTARY ACTUATOR
Frederic J. Staunton, Elmhurst, Ill., assignor to International Telephone and Telegraph Corporation, New York, N.Y., a corporation of Maryland
Filed Jan. 3, 1962, Ser. No. 164,104
10 Claims. (Cl. 310—37)

This invention relates in general to drive mechanisms and in particular to electro-magnetic rotary actuators of the type used in devices such as stepping switches, stepping motors and rotary position controllers.

Electro-magnetic actuators, which are the principal components of stepping switches and the like, very often utilize a pair of electro-magnetic coils spaced apart and parallel to each other. The coils, when energized, are polarized in opposite directions. That is, the north pole of the first coils is closest to and across from the south pole of the second coil. A bar of magnetic material is placed in a position so that it butts against one end of both the coils which are normal to it, thereby magnetically joining the coils in a series aiding position forming a horseshoe type magnet. An armature is pivotably or rotatably mounted across and normal to the open end of the coils. When the coils are energized the armature pivots or rotates responsive to magnetic forces. A drive mechanism attached to the armature converts the magnetic forces to mechanical torque responsive to this rotation. While these devices supply a relatively high torque they are inefficient.

One cause of the inefficiency is that flux leakage paths exist between the dissimilar pole pieces of the coils of the armature end. Thus, to compensate for this leakage, flux in excess of that required to obtain the desired torque must be generated. This requires greater current with the consequent necessity of heavier contact points and arc suppression devices.

Another cause of the inefficiency is that the starting torque is smaller than the final torque because the torque is an inverse function of the square of the distance between the acting pole faces and the armature. Flux well in excess of that necessary for the operating torque is required to obtain the required starting torque since this distance is a maximum when the armature is in its normal unoperated position. This results in noisy and self-destructive operation as well as severely limiting the possible armature load.

A known arrangement to reduce flux leakage is to physically increase the separation between electro-magnetic coils, thereby increasing the reluctance of the leakage path. This however results in a larger and bulkier drive mechanism and of course increases the distance between the acting pole faces and the armature.

Therefore an object of the present invention is to provide improved electro-magnetic rotary actuators that are compact, efficient, reliable and economical to manufacture and operate.

A further object is to provide electro-magnetic rotary actuators wherein leakage flux is minimized and starting torque is increased.

Another object is to provide electro-magnetic rotary actuators which have an increased torque per unit current.

Yet another object is to provide a small and compact electro-magnetic rotary drive mechanism that supplies a large torque.

A still further object is to provide electro-magnetic rotary mechanisms comprised of a minimum of parts.

According to one aspect of the invention these and other objects are accomplished by using a rotary actuator arrangement wherein two longitudinal iron core coils are spaced apart, opposite and parallel to each other and are magnetically polarized in the same direction. Thus, the north pole of the first coil is closer to the north pole of the second coil than to the south pole of the second coil. Similarly, the south pole of the first coil is closer to the south pole of the second coil than to the north pole of the second coil. A magnetic shunt connects the cores of the separate coils from one pole of the first coil to an opposite pole of the second coil; the unjoined ends of the cores act as the pole pieces. An armature having two pole faces corresponding to the two pole pieces is rotatably mounted so that the pole faces are moved closer to the pole pieces, to minimize the air gaps therebetween, when the coils are energized. A spring retains the armature in a normal position wherein the air gap between the pole pieces and pole faces is at a maximum. In this normal position an edge of each pole face substantially abuts an edge of each end of the magnetic shunt where it joins the ends of the coils. When the coils are energized the flux flowing from the poles magnetizes the armature in a direction that causes the pole faces to be attracted towards the pole pieces. The magnetization also causes the pole faces to be repulsed toward the pole pieces by the portions of the coil cores that are connected by the magnetic shunt. Thus, when the coils are energized a torque is exerted on the armature by forces of attraction and also by forces of repulsion. In addition to increasing the torque, this arrangement of the coils wherein the like poles of the two coils are in closer proximity than the unlike poles reduces leakage flux. The resulting rotary actuator is very compact and extremely efficient.

The above mentioned and other objects of this invention together with the manner of obtaining them will become more apparent and the invention itself will be best understood by making reference to the following description of one preferred embodiment of the invention taken in conjunction with accompanying single sheet of drawings wherein.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the drawings show the armature rotatably mounted; whereas the armature could also be pivotably mounted. Quite obviously, other examples could be selected to indicate the manner in which the terms used and the items described are entitled to a wide range of equivalents.

Figure 1:
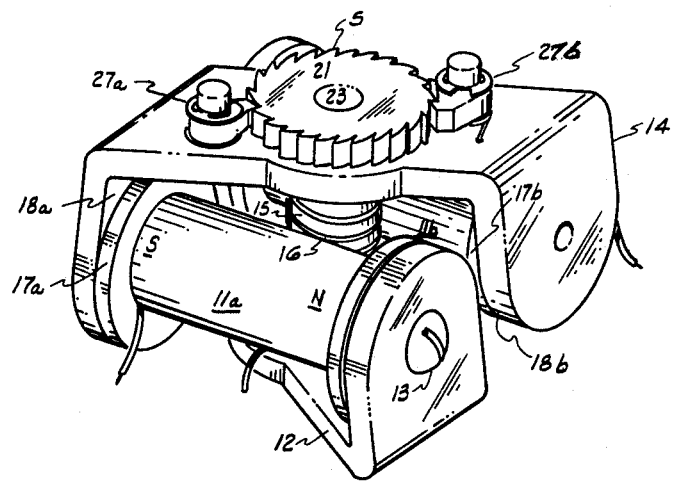
FIG. 1 is a perspective view of a preferred embodiment of the invention.

FIG. 1 of the drawings shows an electro-magnetic rotary actuator with means for generating a magnetic field such as longitudinal iron core coils $11a$ and $11b$. When energized the coils are magnetized in the same direction; that is, the north pole of each coil is in the same relative position. This is shown in the drawing where the right hand portion of coil $11a$ and the right hand portion of coil $11b$ are designated by an "N" as a north pole and in a similar manner the left hand portion of each of the coils are designated as south poles by an "S." Of course, the polarities can be reversed on both coils without any change in the operation of the actuator.

Coils 11a and 11b are magnetically connected to each other in order to decrease the reluctance of the flux path and hence to cause a greater amount of flux to be available in the air gaps. In actuators now in use, the separate coils are magnetized in opposite directions so that the north pole of one coil is closer to the south pole of the other coil than to the north pole of the other coil. A magnetic connection is then made between two of the poles that are substantially adjacent to each other. In contrast, this invention magnetically connects the two coils with a magnetic shunt bar such as shunt 12 which extends diagonally from one end of coil 11a to the other end of coil 11b. The shunt bar may be connected to the coils by any suitable fastener such as screw 13. This arrangement of coils greatly decreases the leakage flux which normally travels between the poles of the coils that are not connected by the magnetic shunt. The decrease in flux results from the increased length of the flux path between the north pole of one coil and the south pole of the other coil.

To be effective, the magnetic flux must be converted to mechanical force. Means such as armature 14 which is rotatably mounted on post 15 between the two coils is provided for accomplishing the conversion of magnetic flux to force. The armature has a normal position which it maintains while the coils are not energized. In this position the air gap between the coils of the armature is at a maximum and the armature is substantially butting up against the ends of the magnetic shunt bar. Restraining means such as spring 16 is used to keep the armature in this position. The ends of the armature are the pole faces 18a and 18b opposite the ends or pole pieces of the coils here shown as pole pieces 17a and 17b. The armature is shaped so that the area of the pole faces 18a and 18b is substantially equal to the area of the pole pieces 17a, 17b and hence offer much less reluctance to the passage of the flux than is offered by the small area presented by the edges of the armature that abut the ends of the magnetic shunt 12.

When the coils are energized the armature moves to an operated position wherein the air gap is minimized. When the coils are subsequently de-energized the restraining spring 16 causes the armature 14 to return to its normal position. Thus responsive to the energization and de-energization of the coils, the armature 14 oscillates between its normal and its operated positions. Means such as ratchet wheel 21 and pawl assemblies 22a and 22b are provided for converting this reciprocal motion into a unidirectional motion.

More specifically, the ratchet wheel 21 is fixedly connected to drive shaft 23. When the armature 14 rotates from its normal position to its operated position, pawls 22a and 22 B which are fixedly connected to armature 14 latch on to wheel 21 causing it and the shaft 23 to turn with the armature. When the armature returns to its normal position, pawls 22a and 22b move freely past the ratchet wheel and it does not rotate. Thus the drive shaft 23 is caused to rotate in only one direction. Of course as is readily apparent to one skilled in the art, the ratchet wheel and pawl assembly can also be made to operate so that wheel 21 and drive shaft 23 rotate when the armature is returning from its operated position to its normal position.

To increase the efficiency of the actuator the pivot means is made of some non-magnetizable material such as brass so that magnetic locking will not occur at the pivot.

An additional feature of the invention is the small number of parts necessary. This advantage is possible because armature 14 and shunt bar 12 can be fabricated from the same piece part as is apparent in FIG. 1. A collateral advantage of this actuator is that the armature and the shunt can be punched out rather than milled. This further increasing the economies of the device while maintaining equivalent mechanical tolerances.

Figure 2A:
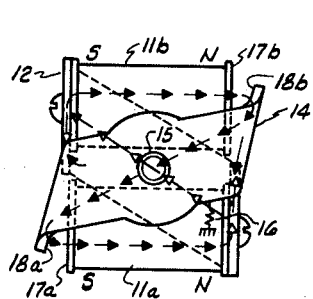
FIG. 2a is a schematic representation of the preferred embodiment in its unoperated or normal position.
Figure 2B:
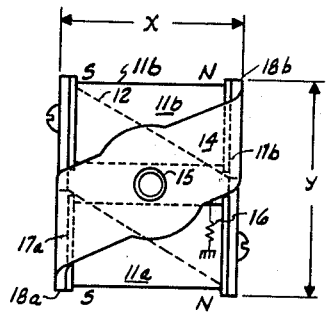
FIG. 2b is a schematic representation of the preferred embodiment in its operated position.

Refer now to the schematic representation of FIGS. 2a and 2b for a more detailed description of the operation of the preferred embodiment of the invention shown in FIG. 1 and note that the component parts of the actuator of FIGS. 2a and 2b are the same as those shown in the perspective view of FIG. 1. Therefore, the number designations utilized on each of the drawings correspond respectively.

When the coils 11a and 11b are energized a magnetic field is set up. Flux passes from the north pole of coil 11a through shunt bar 12, the south pole of coil 11b, the core of the coil to the north pole of the coil, the air gap between pole piece 17b and the pole face 18b, armature 14, the air gap between pole face 18a and pole piece 17a and finally from the south pole of coil 11a to its north pole. The differences in the cross-sectional areas presented to the flux by the edge of the pole face that abuts the shunt bar and by the part of the pole face that is opposite the pole piece causes there to be a relatively smaller reluctance in the flux path between the pole piece and the pole face than there is in the flux path between the shunt bar and the pole face. Therefore, relatively little flux passes between the magentic shunt 12 and the armature 14 as compared to the flux that passes through the working air gaps between the pole pieces 17a, 17b and the pole faces 18a, 18b. The armature 14 is thus magnetized so that a force of repulsion is set up between the magnetic shunt 12 and the armature. This repulsive force is in a direction that causes the armature 14 to move so as to shorten the air gaps. At the same time a force of attraction between the pole pieces 17a, 17b of the coils 11a, 11b and the pole faces 18a, 18b of the armature 14 also causes the armature to move to shorten the air gaps.

Arrows are used in FIG. 2a to schematically depict the alignment of the domains in the magnetic structure lying in the flux path. Solid line arrows show the domains in the cores of coils 11a, 11b and the armature 14 and dotted line arrows show the domains in the shunt 12. The repulsive forces set up due to the flux fields are illustrated by the use of arrow heads pointing toward each other.

While the armature 14 is in its normal position, the force of attraction is at a minimum since this force is an inverse function of the square of the distance between the pole pieces 17a 17b and the pole faces 18a, 18b. At the same time the force of repulsion is at a maximum since this too is an inverse square function. As the armature 14 draws closer to the coils the force of repulsion decreases toward a minimum and the force of attraction increases toward a maximum. Finally, as shown in FIG. 2b, the armature is moved against the normal inertia forces, friction forces and the restraining force of spring 16 to its operated position where its pole faces 18a, 18b are congruent to the pole pieces 17a, 17b of the coils 11a, 11b.

The effectiveness of the repulsive forces depend of course on the distance between the pole pieces and the pole faces. One preferred embodiment of the invention was found to work most effectively when the actuator was of a rectangular configuration and where the dimensions $x$ and $y$ shown in FIG. 2b were approximately equal.

Figure 3:
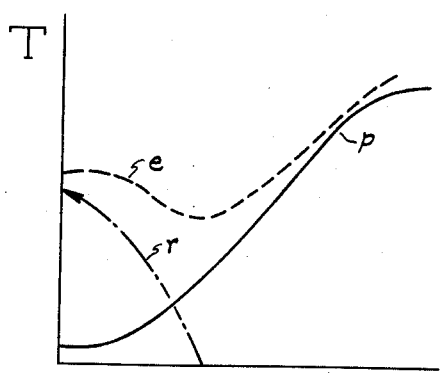
FIG. 3 is a graphical plot of torque versus decreasing air gap.

The effect of the repulsive force is depicted graphically in FIG. 3. Therein a plot is shown of torque (T) versus decreasing air gap length ($g$). The solid line (labeled "$p$") shows the torque characteristics of prior art electromagnetic rotary actuators. The dot-dash line (labeled "$r$") shows the torque caused by the force of repulsion. The dashed line (labeled "$e$") shows the torque characteristics of an electro-magnetic rotary actuator employing the principles of this invention. When the air gap is at a maximum, most of the armature torque is caused by the repulsion force (curve "$r$") exerted by the shunt bar when in contact with the armature. As can be seen, this torque is maximum when the air gap length is a maximum and drops off rapidly as the air gap length decreases. The other torque exerted on the armature is due to the attraction between the pole pieces and the pole faces. This torque is normally a minimum when the air gap length is a maximum as can be seen from curve "p." The total torque "e" exerted on the armature is relatively large and is exerted even when the armature is in its normal position when the air gap length is a maximum. In contrast, in rotary actuators previously known, the torque exerted on the armature (as shown by curve "p") in its normal position has been relatively small.

While the principles of the invention have been described in connection with specific apparatus, it is to be clearly understood that this description is made only by way of example and not as a limitation to the scope of the invention as set forth in the objects thereof and in the accompanying claims.

I claim:

1. An electro-magnetic rotary actuatory comprising a first coil having a north and a south pole when energized to generate a magnetic flux field, a second coil having a north and a south pole when energized to generate a magnetic flux field, said coils positioned relative to each other so that the like poles of said coils are closer to each other than the opposite poles, magnetic shunt means for magnetically connecting two opposite poles of said first and said second coils to provide a low reluctance flux path therebetween, armature means lying in the flux path between the unconnected poles of said first coil and said second coil, pivot means on which said armature moves from a normal position to an operated position responsive to a torque caused by said generated magnetic flux field, and means for connecting said armature to a drive shaft to cause said drive shaft to operate responsive to the energization of said coils.

2. The electro-magnetic rotary actuator of claim 1 wherein said armature presents a first flux path of relatively low reluctance to the flux of the unconnected poles and a second flux path of relatively high reluctance to the flux of the connected poles thereby polarizing said armature so that it is repelled by said connected poles when said coils are energized.

3. The electro-magnetic rotary actuator of claim 2 wherein said first flux path includes a wide area facing said poles at each end of said armature and said second flux path includes a narrow area of said armature abutting said connecting poles.

4. An electro-magnetic rotary actuator comprising a first iron core coil, a second iron core coil parallel to and spaced apart from said first iron core coil, said coils both being polarized in the same direction when said coils are energized, magnetic shunt means connecting said iron core coils from one pole of said first iron core coil to an opposite pole of said second iron core coil, a first pole piece comprising the unconnected end of said first iron core coil, a second pole piece comprising the unconnected end of said second iron core coil, pivot means mounted on said shunt and between said iron core coils, armature means having a first pole face and a second pole face corresponding respectively to said first pole piece and said second pole piece rotatably mounted on said pivot means, restraining means for keeping said armature in a normal position wherein air gaps between said pole pieces and said pole faces are a maximum length and an edge of each of said pole faces substantially abuts said magnetic shunt where it connects to said iron core coils, means for energizing said coils to polarize said iron core coils to set up a flux field causing the armature to be acted upon by forces of attraction between said pole pieces and said pole faces and by forces of repulsion between said pole faces and said magnetic shunt thereby rotating said armature on said pivot to an operated position wherein the said air gap is a minimum length.

5. The electro-magnetic rotary actuator of claim 4 wherein drive means are connected to said armature.

6. The electro-magnetic rotary actuator of claim 5 where said drive means is a unidirectional drive means.

7. The electro-magnetic rotary actuator of claim 4 wherein said armature and said magnetic shunt are fabricated from the same piece part.

8. The electro-magnetic rotary actuator of claim 4 wherein the length of said actuator assembly is substantially equal to its breadth.

9. The electro-magnetic rotary actuator of claim 8 wherein the area of said pole faces is much larger than the area of said edges of said pole faces.

10. In an electro-magnetic rotary actuator comprising magnetic structure having first and second pole pieces at opposite ends of said structure, flux generating means associated with said structure for causing magnetic flux to flow through said structure out of said first pole piece and into second pole piece, pivot means, armature means having a pole face at each end thereof movably mounted on said pivot means for travelling between a normal position and an operated position, each of said pole faces associated respectively with said pole pieces and having air gaps between said pole pieces and said pole faces, said normal position being where said armature is contiguous with said magnetic structure and said air gap is at maximum, said operated position being where said air gap is at a minimum, said armature positioned in said flux path so that the flux from said pole pieces flows through said armature attracting said pole faces toward said respective pole pieces and repulsing said armature from said magnetic structure toward said pole pieces, restraining means for maintaining said armature in said normal position so that said armature travels from said normal position to said operated position when said flux generating means is operated and from said operated position to said normal position when said flux generating means is not operated, and drive means operated responsive to said movement of said armature.

No references cited.